United States Patent
Park et al.

(10) Patent No.: US 9,354,463 B2
(45) Date of Patent: May 31, 2016

(54) DISPLAY APPARATUS AND METHOD OF MANUFACTURING THE SAME

(71) Applicant: SAMSUNG DISPLAY CO., LTD., Yongin, Gyeonggi-Do (KR)

(72) Inventors: Heungshik Park, Seoul (KR); Yun Jang, Hwaseong-Si (KR); Seungbeom Park, Hwaseong-Si (KR); Kichul Shin, Seongnam-Si (KR); Hyeokjin Lee, Seongnam-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 224 days.

(21) Appl. No.: 14/103,475

(22) Filed: Dec. 11, 2013

(65) Prior Publication Data

US 2014/0375933 A1    Dec. 25, 2014

(30) Foreign Application Priority Data

Jun. 25, 2013 (KR) .................. 10-2013-0073241

(51) Int. Cl.
 *G02F 1/13363* (2006.01)
 *G02F 1/1335* (2006.01)
 (Continued)

(52) U.S. Cl.
 CPC ........ *G02F 1/133502* (2013.01); *G02B 5/3016* (2013.01); *G02B 5/3083* (2013.01);
 (Continued)

(58) Field of Classification Search
 CPC ............ G02F 2001/133541; G02F 1/133502; G02F 1/133528; G02F 1/13363; G02F 2001/133638; G02F 2001/133631; G02F 2413/07; G02B 5/3033; G02B 5/3016; G02B 5/3083

USPC .................. 349/98, 96, 102, 103, 117, 119; 359/483, 483.01, 489.07

See application file for complete search history.

(56) References Cited

U.S. PATENT DOCUMENTS 4,007,979 A   2/1977   Coblitz
5,066,108 A   11/1991  McDonald
(Continued)

FOREIGN PATENT DOCUMENTS

JP   10-227998    8/1998
JP   2010-072666  4/2010
(Continued)

OTHER PUBLICATIONS

English Abstract Publication No. 10-2000-0075086 (FOR 10-0697259).

(Continued)

*Primary Examiner* — Michael Caley
*Assistant Examiner* — Jia Pan
(74) *Attorney, Agent, or Firm* — F. Chau & Associates, LLC

(57) ABSTRACT

A display apparatus includes a display panel, a polarizing plate, and a patterned retarder. The display panel includes a first substrate including a signal line and a pixel. A second substrate faces the first substrate. An image display device is disposed between the first and second substrates. The first substrate is disposed in a position to which external light is incident. The polarizing plate is disposed above the first substrate of the display panel. The patterned retarder is disposed between the polarizing plate and the signal line. The patterned retarder retards the external light such that the external light reflected by the signal line does not pass through the polarizing plate.

17 Claims, 8 Drawing Sheets

(51) Int. Cl.
  *G02B 5/30* (2006.01)
  *G02F 1/1368* (2006.01)
(52) U.S. Cl.
  CPC ....... *G02F1/13363* (2013.01); *G02F 1/133528* (2013.01); *G02F 2001/13685* (2013.01); *G02F 2001/133541* (2013.01); *G02F 2001/133638* (2013.01); *G02F 2413/01* (2013.01); *G02F 2413/07* (2013.01)

(56) References Cited

U.S. PATENT DOCUMENTS

| | | | | |
|---|---|---|---|---|
| 6,204,904 | B1 * | 3/2001 | Tillin | G02F 1/13363 349/113 |
| 7,327,421 | B2 * | 2/2008 | Kaneko | G02F 1/133555 349/114 |
| 8,824,048 | B2 * | 9/2014 | Nakazawa | G02F 1/0136 313/112 |
| 2002/0054261 | A1 * | 5/2002 | Sekiguchi | G02F 1/13338 349/122 |
| 2002/0145689 | A1 * | 10/2002 | Kaneko | G02F 1/133555 349/114 |
| 2003/0081161 | A1 * | 5/2003 | Ozawa | G02F 1/133536 349/115 |
| 2005/0068481 | A1 * | 3/2005 | Kobayashi | G02F 1/1393 349/130 |
| 2007/0029550 | A1 * | 2/2007 | Yoshida | G02F 1/1393 257/59 |
| 2011/0051061 | A1 * | 3/2011 | Sakai | G02B 5/3083 349/117 |

FOREIGN PATENT DOCUMENTS

| | | |
|---|---|---|
| KR | 10-0697259 | 3/2007 |
| KR | 10-2011-0138571 | 12/2011 |
| KR | 10-2012-0063429 | 6/2012 |
| KR | 10-2013-0020978 | 3/2013 |

OTHER PUBLICATIONS

Paul Lilie "Wide-Band Circular Polarizers Made With Quarter-Wave Andhalf-Wave Plates," pp. 1-7, Nov. 6, 2001.

* cited by examiner

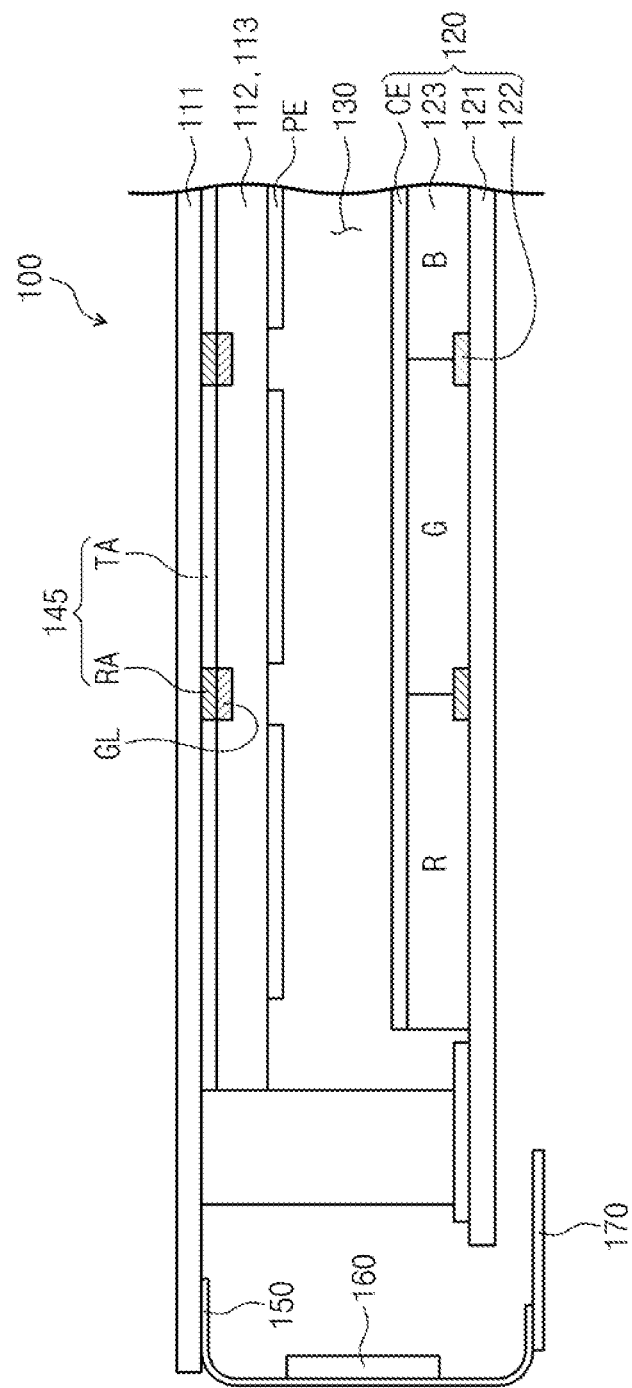

DISPLAY APPARATUS AND METHOD OF MANUFACTURING THE SAME

CROSS-REFERENCE TO RELATED APPLICATION

This U.S. non-provisional patent application claims priority under 35 U.S.C. §119 of Korean Patent Application No. 10-2013-0073241, filed on Jun. 25, 2013, the disclosure of which is incorporated by reference herein in its entirety.

TECHNICAL FIELD

Exemplary embodiments of the present disclosure relate to displays, and more specifically, to a display apparatus and a method of manufacturing the same.

DISCUSSION OF THE RELATED ART

A flat display apparatus includes a display panel for displaying an image and a backlight unit for supplying light to the display panel. The display panel includes two substrates facing each other and a liquid crystal layer interposed between the two substrates.

A lower substrate of the two substrates is disposed relatively adjacent to the backlight unit and includes a plurality of pixels and a plurality of signal lines for receiving driving signals from an external source. Some parts, such as a tape carrier package and a printed circuit board, are attached to the lower substrate to apply driving signals to the display panel, and this renders it difficult for the display apparatus to have a narrow bezel.

SUMMARY

An exemplary embodiment of the present disclosure provides a display apparatus including a display panel, a polarizing plate, and a patterned retarder.

The display panel includes a first substrate including a signal line and a pixel. A second substrate faces the first substrate. An image display device is disposed between the first and second substrates. The first substrate is disposed in a position to which external light is incident. The polarizing plate is disposed above the first substrate of the display panel. The patterned retarder is disposed between the polarizing plate and the signal line. The patterned retarder retards the external light such that the external light reflected by the signal line does not pass through the polarizing plate.

An exemplary embodiment of the present disclosure provides a method of manufacturing a display apparatus. The method includes forming a display panel. The display panel includes a first substrate including a signal line and a pixel. A second substrate faces the first substrate. An image display device is disposed between the first and second substrates. The first substrate is disposed in a position to which external light is incident. A patterned retarder is formed on the display panel. A polarizing plate is attached onto the first substrate of the display panel in which the patterned retarder is formed. The patterned retarder is disposed between the polarizing plate and the signal line and retards the external light such that the external light reflected by the signal does not pass through the polarizing plate.

An exemplary embodiment of the present disclosure provides a display apparatus. The display apparatus comprises a display panel. The display panel comprises a first substrate including a signal line and a pixel. A second substrate faces the first substrate. A first polarizer is disposed above the first substrate of the display panel. The first polarizer is configured to linearly polarize external light. A second polarizer is disposed between the first polarizer and the signal line. The second polarizer is configured to circularly polarize the linearly polarized external light. For example, the linearly polarized external light (hereinafter, referred to as first linearly polarized external light) turns into left-hand circularly polarized light. The left-hand circularly polarized light is reflected by the signal line, turning into right-hand circularly polarized light. The right-hand circularly polarized light turns into linearly polarized light (hereinafter, referred to as second linearly polarized external light) when passing through the second polarizer. The polarizing axis of the second linearly polarized external light is substantially perpendicular to the polarizing axis of the first linearly polarized external light. Accordingly, the second linearly polarized external light is blocked by the first polarizer.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 9 is a cross-sectional view taken along line II-II' shown in FIG. 8, according to an exemplary embodiment of the present disclosure.

DETAILED DESCRIPTION OF EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like or similar elements throughout the specification and the drawings. As used herein, the singular forms, "a", "an" and "the" are intended to include the plural forms as well, unless the context clearly indicates otherwise.

Hereinafter, exemplary embodiments of the present disclosure will be described in detail with reference to the accompanying drawings. The present disclosure, however, may be modified in various different ways, and should not be construed as limited to the embodiments set forth herein.

Figure 1:
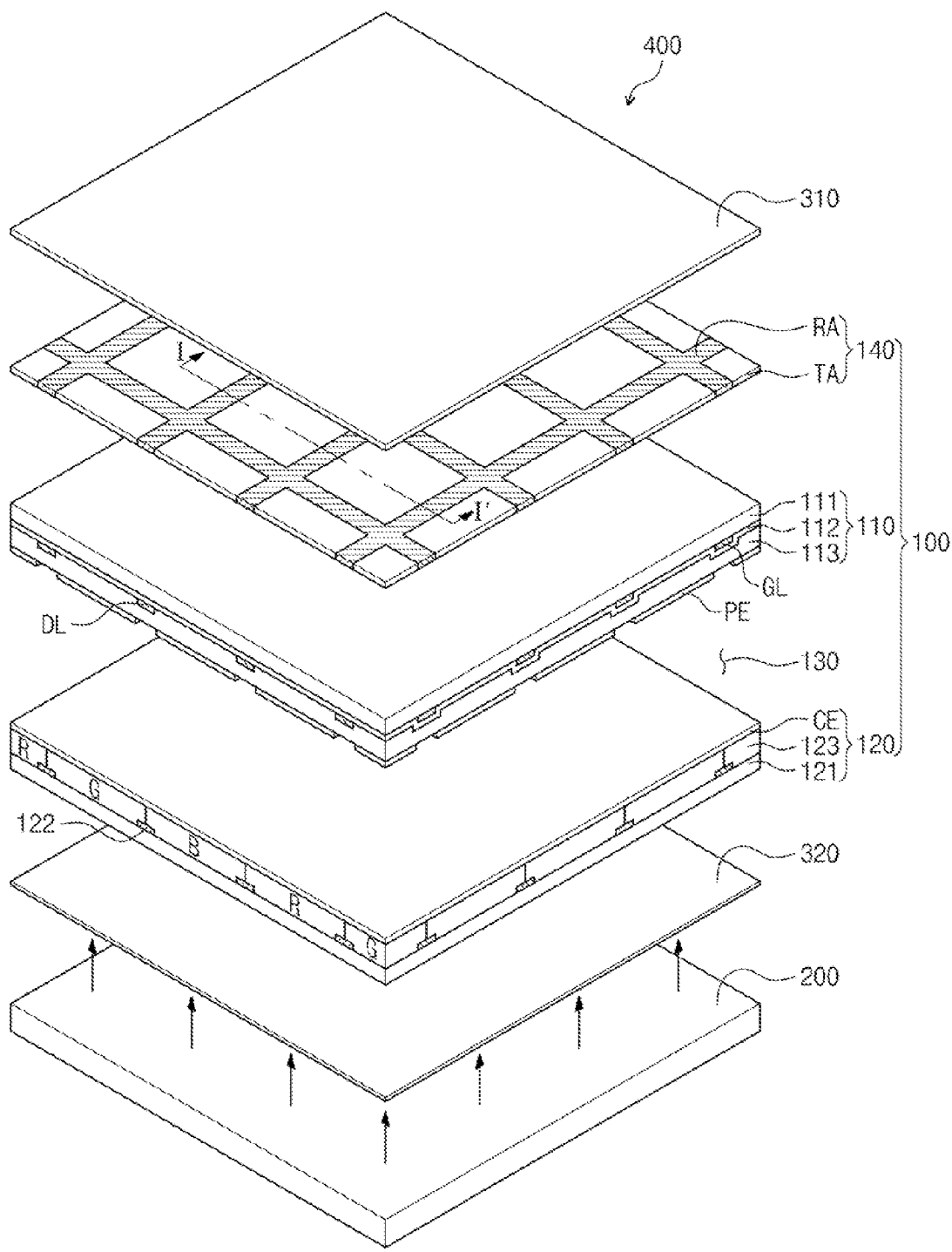
FIG. 1 is an exploded perspective view showing a display apparatus according to an exemplary embodiment of the present disclosure.
Figure 2:
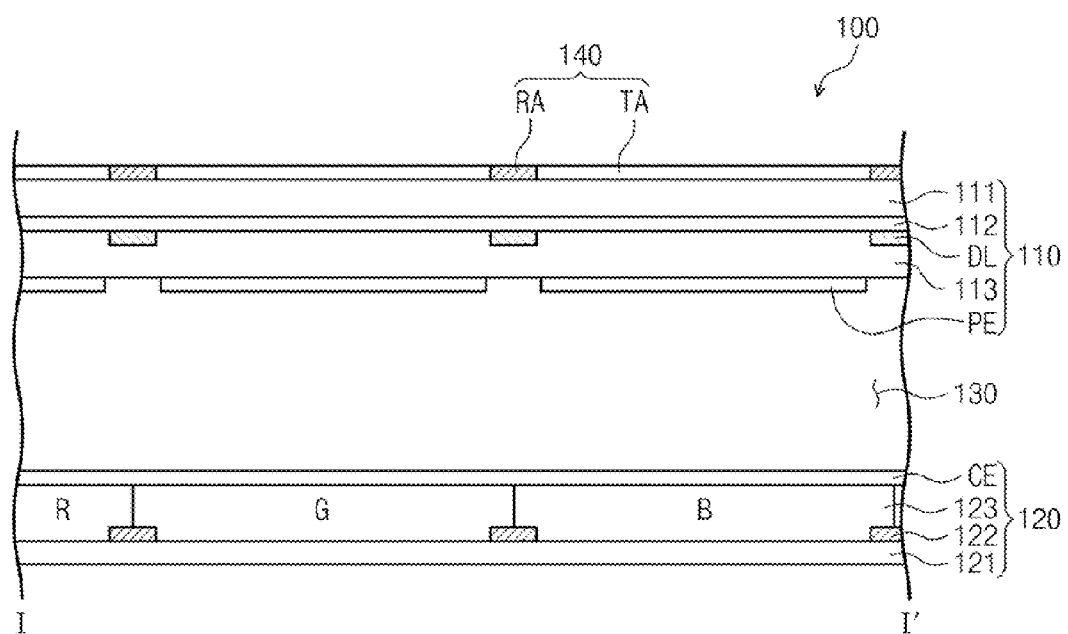
FIG. 2 is a cross-sectional view taken along line I-I' of FIG. 1, according to an exemplary embodiment of the present disclosure.

FIG. 1 is an exploded perspective view showing a display apparatus according to an exemplary embodiment of the present disclosure, and FIG. 2 is a cross-sectional view taken along line I-I' shown in FIG. 1, according to an exemplary embodiment of the present disclosure.

Referring to FIG. 1, a display apparatus 400 includes a liquid crystal display panel 100 for displaying an image and a backlight unit 200 for generating light and supplying the light to the liquid crystal display panel 100.

The liquid crystal display panel 100 includes two substrates 110 and 120 (hereinafter, referred to as first and second substrates, respectively) facing each other and a liquid crystal layer 130 interposed between the first substrate 110 and the second substrate 120. In an exemplary embodiment of the present disclosure, the display apparatus 400 includes the liquid crystal display panel 100 as its display panel, but exemplary embodiments of the present disclosure are not limited to the liquid crystal display panel 100.

The first substrate 110 includes a first base substrate 111 and a plurality of pixels disposed on the first base substrate 111. The pixels may be disposed on one of the two substrates 110 and 120. When the pixels are disposed on the first substrate 110, a plurality of color pixels 123, together with the pixels, is disposed on the first substrate 110, or the plurality of color pixels 123 is disposed on the second substrate 120 separately from the pixels. As shown in FIG. 1, the pixels are disposed on the first substrate 110 and the color pixels 123 are disposed on the second substrate 120.

The first substrate 110 further includes a plurality of gate lines GL and a plurality of data lines DL. The gate lines GL are extended in a row direction of the pixels and are arranged in a column direction of the pixels substantially in parallel to each other. The data lines DL are extended in the column direction of the pixels and are arranged in the row direction of the pixels substantially in parallel to each other. As an example, the gate lines GL are disposed on the first base substrate 110 and the data lines DL are disposed on a gate insulating layer 112 that covers the gate lines GL. Thus, the gate lines GL are electrically insulated from the data lines DL while crossing the data lines DL.

In FIG. 1, the gate lines GL and the data lines DL are extended in the row or column direction of the pixels and each may have a stripe shape, but the shape of the gate lines DL and data lines DL are not limited to the stripe shape. For instance, the gate lines GL or the data lines DL may have bents and thus may have a zigzag shape.

Each of the pixels includes a thin film transistor connected to its corresponding gate line of the gate lines GL and its corresponding data line of the data lines DL and a pixel electrode PE electrically connected to the thin film transistor. The thin film transistor includes a gate electrode connected to its corresponding gate line, a source electrode connected to its corresponding data line, and a drain electrode connected to the pixel electrode PE.

The first base substrate 111 may be a transparent insulating substrate, e.g., a silicon substrate, a glass substrate, a plastic substrate, etc. The gate line GL and the data line DL are formed of a metal, such as nickel, chromium, molybdenum, aluminum, titanium, copper, tungsten, and/or alloys thereof. Each of the gate line GL and the data line DL has a single layer or multiple layers. For example, each of the gate line GL and the data line DL has a triple-layered structure of molybdenum, aluminum, and molybdenum, which are sequentially stacked, a double-layer structure of titanium and copper, which are sequentially stacked, or a single-layer structure of an alloy of titanium and copper.

The second substrate 120 includes a second base substrate 121 facing the first base substrate 111, a black matrix 122, the color pixels 123, and a common electrode CE, which are disposed on the second base substrate 121.

The black matrix 122 is disposed in a non-effective area corresponding to the gate lines GL and the data lines DL. The black matrix 122 partitions pixel areas in which the pixels are disposed and blocks light. For example, the black matrix 122 prevents light leakage or color mixing. In an exemplary embodiment of the present disclosure, the black matrix 122 includes a chromium or organic black matrix.

The color pixels 123 are disposed in an effective area of the pixel areas, in which an image is displayed. The color pixels 123 include a red color filter, a green color filter, and a blue color filter and respectively correspond to the pixel areas. The color pixels 123 further include a white color filter or a yellow color filter.

The common electrode CE is disposed on the color pixels 123 to face the pixel electrode PE. The common electrode CE forms an electric field in cooperation with the pixel electrode PE. Since the display apparatus 400 is a transmissive-type display apparatus that transmits light from the backlight unit 200 to display an image, the pixel electrode PE and the common electrode CE are formed of a transparent conductive material. For instance, the pixel electrode PE and the common electrode CE include indium tin oxide (ITO) or indium zinc oxide (IZO).

According to an exemplary embodiment of the present disclosure, the liquid crystal layer 130 is provided between the first substrate 110 and the second substrate 120 and is controlled by an electric field formed between the pixel electrode PE and the common electrode CE, thus displaying an image.

The liquid crystal layer 130 includes liquid crystal molecules having an optical anisotropy. The liquid crystal molecules are driven by an electric field, allowing light emitted from the backlight unit 200 to passing through the liquid crystal layer 130 or to be blocked.

An alignment layer is provided between the pixel electrode PE and the liquid crystal layer 130 and between the common electrode CE and the liquid crystal layer 130. The alignment layer initially aligns the liquid crystal molecules. The alignment layer includes an organic polymer, e.g., polyimide and/or polyamic acid.

As shown in FIG. 1, the backlight unit 200 is disposed at a rear side of the liquid crystal display panel 100 and supplies light to the liquid crystal display panel 100. As an example, the backlight unit 200 includes a plurality of light emitting diodes as its light source. The light emitting diodes are arranged on a printed circuit board in the form of a stripe or a matrix.

The display apparatus 400 further includes a first polarizing plate 310 disposed on the liquid crystal display panel 100 and a second polarizing plate 320 disposed between the backlight unit 200 and the liquid crystal display panel 100. The first polarizing plate 310 has a polarizing axis at a right angle with respect to a polarizing axis of the second polarizing plate 320.

The liquid crystal layer 130 is driven in an electrically controlled birefringence (ECB) mode in which the liquid crystal molecules are positive-type liquid crystal molecules. However, some optical members may be omitted or added in accordance with the type of the liquid crystal layer LC, e.g., depending on whether the liquid crystal layer LC has a positive type or a negative type, and in accordance with the driving mode of the display device, e.g., depending on whether the display device has an in-plane switching (IPS) mode, a vertical alignment (VA) mode, or the ECB mode. The arrangements of the polarizing axes of the first and second polarizing plates 310 and 320 may be changed according to the type of the liquid crystal layer LC and the driving mode of the display device.

The first and second polarizing plates 310 and 320 are respectively attached to upper and lower surfaces of the display panel 100 using an adhesive layer.

In the liquid crystal display panel 100, the second substrate 120 is disposed in a position to which internal light emitted from the backlight unit 200 is incident, and the first substrate 110 is disposed in a position to which external light is incident. The external light may be reflected by the gate lines GL and data lines DL (hereinafter, also referred to as signal lines) formed on the first substrate 110. When the external light is reflected by the signal lines GL and DL to a user's eyes, a contrast ratio of the display apparatus 400 is reduced.

Therefore, the display device 400 further includes a patterned retarder 140 for preventing the contrast ratio from being reduced due to the external light and increasing the visibility thereof. The patterned retarder 140 is disposed on the upper or lower surface of the first base substrate 111 and retards the external light reflected by the signal lines GL and DL, and thus the external light reflected by the signal lines GL and DL does not pass through the first polarizing plate 310.

As shown in FIG. 2, the patterned retarder 140 is disposed on the upper surface of the first base substrate 111. The patterned retarder 140 includes a retard area RA corresponding to the signal lines GL and DL and a transmission area TA corresponding to the effective area of the pixel. In the retard area RA, the patterned retarder 140 has a phase difference of about $\lambda/4$ with respect to the polarizing axis of the first polarizing plate 310, where $\lambda$ is a wavelength of light incident onto the patterned retarder 140.

As an example, the phase difference of the retard area RA may be about 200 nm±130 nm, which is in a range from about 50 nm to about 350 nm, and an optical axis of the retard area RA may be inclined at an angle of about 45°±15°, which is in a range from about 30° to about 60°, with respect to the polarizing axis of the first polarizing plate 310.

Figure 3:
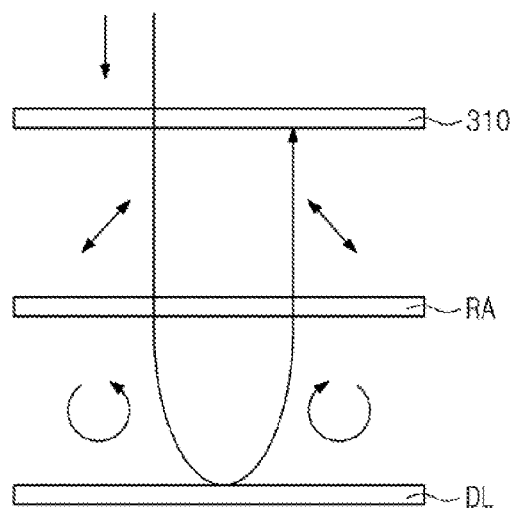
FIG. 3 is a view showing a process of blocking external light reflected by a signal line, according to an exemplary embodiment of the present disclosure.

FIG. 3 is a view showing a process of blocking external light reflected by signal lines according to an exemplary embodiment of the present disclosure.

Referring to FIG. 3, the first polarizing plate 310 linearly polarizes the external light incident to the display apparatus 400. The first polarizing plate 310 is made of polyvinylalcohol (PVA). The first polarizing plate 310 passes external light that matches the polarizing axis thereof and absorbs external light that does not match the polarizing axis thereof.

The linearly-polarized external light passes through the retard area RA of the patterned retarder 140 formed on the upper surface of the first substrate 110. Since the retard area RA has the optical axis twisted at about $\lambda/4$ degrees (±15°) ($\lambda$ is a wavelength of light incident onto the patterned retarder 140) with respect to the polarizing axis of the first polarizing plate 310, the external light is circularly polarized and vibrated in a rotary direction.

Then, the circularly-polarized external light is reflected by surfaces of the signal lines GL and DL, and thus the rotary direction of the external light is reversed. For example, when the light that is right circularly polarized by the retard area RA is incident to the signal lines GL and DL, the light reflected by the signal lines GL and DL is left circularly-polarized light. On the contrary, when the light that is left circularly polarized by the retard area RA is incident to the signal lines GL and DL, the light reflected by the signal lines GL and DL is right circularly-polarized light.

The light reflected by the signal lines GL and DL is linearly polarized again while passing through the retard area RA. In this case, the external light linearly polarized while passing through the retard area RA forms a right angle, e.g., about 90°, with respect to the polarizing axis of the first polarizing plate 310. Accordingly, the linearly-polarized external light does not pass through the first polarizing plate 131 and is absorbed by the first polarizing plate 131.

Since the external light incident to the display apparatus 400 does not exit to the outside of the display apparatus 400, the external light may be prevented from being reflected by the patterned retarder 140, and the contrast ratio of the display apparatus 400 may be increased, thus increasing the display quality of the display apparatus 400.

The transmission area TA corresponds to the effective area, in which the signal lines GL and DL are not formed and the transparent pixel electrode PE is formed, and thus, an image is displayed. Thus, the external light incident through the transmission area TA is not reflected, and thus, the external light is not required to be retarded in the transmission area TA.

The transmission area TA corresponds to the effective area in which an image is displayed. Accordingly, the transmission area TA may have an open shape in which no separate elements are formed to increase the transmittance of the transmission area TA. A plurality of transmission areas TA is independently arranged by the retard area RA.

Figure 4:
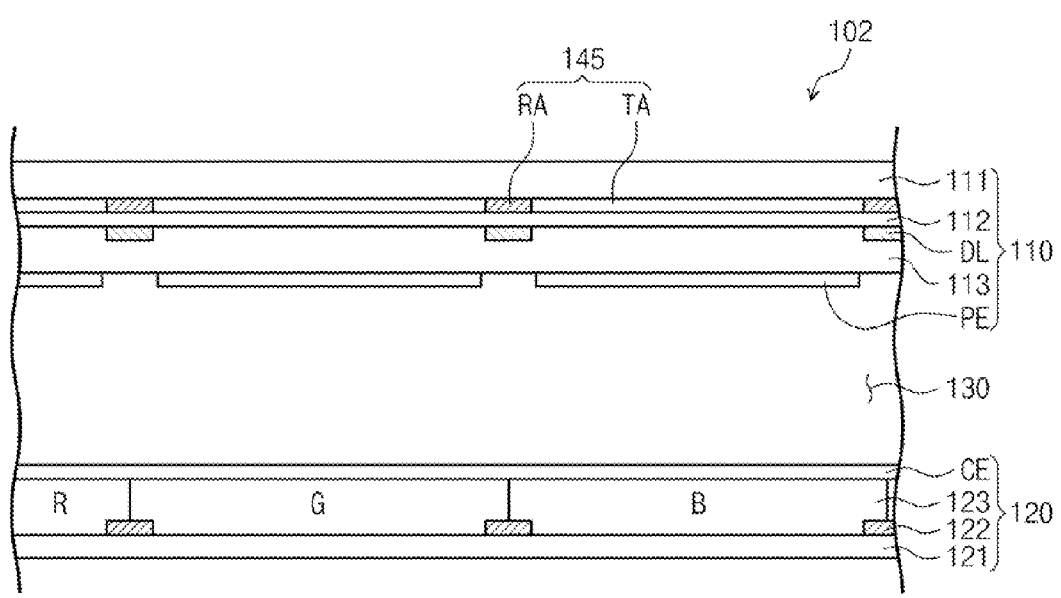
FIG. 4 is a cross-sectional view showing a liquid crystal display panel according to an exemplary embodiment of the present disclosure.

FIG. 4 is a cross-sectional view showing a liquid crystal display panel according to an exemplary embodiment of the present disclosure.

Referring to FIG. 4, in a liquid crystal display panel 102, a patterned retarder 145 is disposed on a lower surface of the first base substrate 111. The patterned retarder 145 includes the retard area RA corresponding to the signal lines GL and DL and the transmission area TA corresponding to the effective area of the pixel. In the retard area RA, the patterned retarder 145 has a phase difference of about $\lambda/4$ with respect to the polarizing axis of the first polarizing plate 310 (where, $\lambda$ is a wavelength of light incident onto the patterned retarder 145).

In an exemplary embodiment of the present disclosure, the patterned retarder 145 shown in FIG. 4 has substantially the same structure and function as the patterned retarder 140 shown in FIG. 2 except that the patterned retarder 145 is disposed on the lower surface of the first base substrate 111.

Figure 5A:
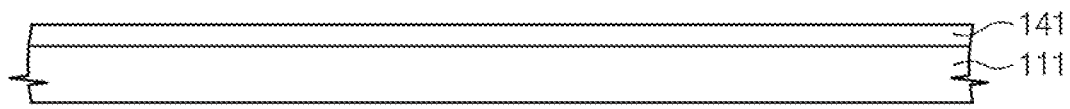
FIGS. 5A to 5C are cross-sectional views showing a process of forming a patterned retarder shown in FIG. 2, according to an exemplary embodiment of the present disclosure.
Figure 5B:
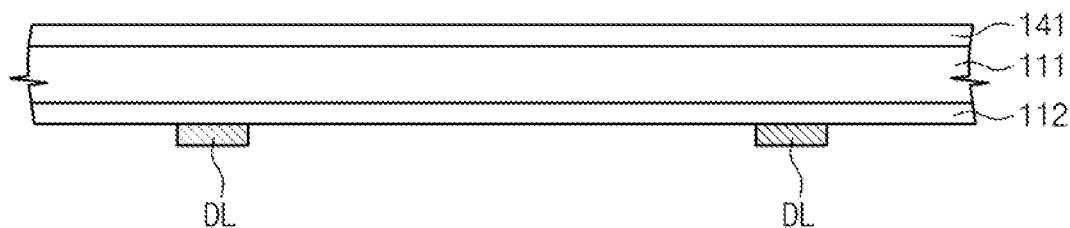
Figure 5C:
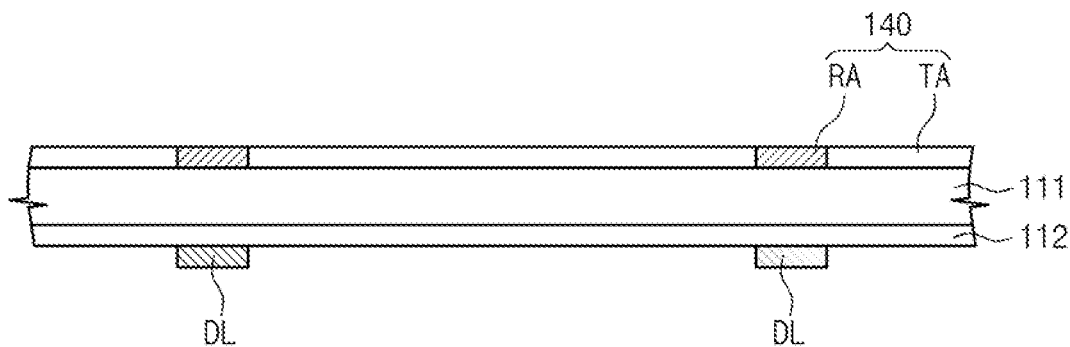

FIGS. 5A to 5C are cross-sectional views showing a process of forming a patterned retarder shown in FIG. 2, according to an exemplary embodiment of the present disclosure.

Referring to FIG. 5A, a phase delay layer 141 is coated on the upper surface of the first base substrate 111.

The phase delay layer 141 is classified into an A-plate, a C-plate, and a biaxial film according to its anisotropic refractive index.

For example, a material through which light passes has refractive indices ($n_x$, $n_y$, $n_z$) in x-, y-, and z-directions, respectively. When the refractive indices ($n_x$, $n_y$, $n_z$) are the same, the material is referred to as an isotropic material, and when all or some of the refractive indices ($n_x$, $n_y$, $n_z$) are different from each other, the material is referred to as an anisotropic material. When the material has a film shape, a thickness direction of the film is referred to as a z-axis direction, one of surface directions of the film is referred to as an x-axis direction, and the other of the surface directions of the film is referred to as a y-axis direction that is substantially perpendicular to the x-axis direction.

Among the refractive indices (nx, ny, nz) in the x-, y-, and z-directions, when the refractive indices in two directions are the same and the refractive index in the remaining one direction is different from the two directions, the film is referred to as a uniaxial film, and when the refractive indices (nx, ny, nz) in the three directions (x-, y-, and z-directions) are different from each other, the film is referred to as a biaxial film.

When the refractive indices of the surface directions are different from each other in the uniaxial film, the phase delay layer 141 is referred to as the A-plate. The A-plate is classified into a positive A-plate in which the refractive index nx of the x-axis direction is larger than the refractive index ny of the y-axis direction and a negative A-plate in which the refractive index nx of the x-axis direction is smaller than the refractive index ny of the y-axis direction.

When the refractive index of the thickness direction is different from the refractive indices of the surface directions in the uniaxial film, the phase delay layer 141 is called the C-plate. The C-plate is classified into a positive C-plate in which the refractive index nz of the z-axis direction is larger than the refractive indices nx and ny of the x- and y-axis directions and a negative C-plate in which the refractive index nz of the z-axis direction is smaller than the refractive indices nx and ny of the x- and y-axis directions.

The phase difference value R of the uniaxial film is defined by the following Equation 1:

$$R = d \times \Delta n = d \times (n_e - n_o) \quad \text{[Equation 1]}$$

In Equation 1, "d" denotes a thickness of the plate, "$n_e$" denotes an abnormal refractive index, and "$n_o$" denotes a normal refractive index.

The biaxial film indicates a film having the phase difference in the surface direction and the phase difference in the thickness direction. The biaxial film is classified into a positive biaxial film in which the refractive index nz of the z-axis direction is larger than the refractive indices nx and ny of the x- and y-axis directions and a negative biaxial film in which the refractive index nz of the z-axis direction is smaller than the refractive indices nx and ny of the x- and y-axis directions.

The phase difference value $R_{in}$ in the surface direction and the phase difference value $R_{th}$ in the thickness direction of the biaxial film are defined by the following Equations 2 and 3:

$$R_{in} = d \times (n_x - n_y) \quad \text{[Equation 2]}$$

In Equation 2, "d" denotes the thickness of the film, "$n_x$" denotes the refractive index in the x-axis direction, and "$n_y$" denotes the y-axis refractive index.

$$R_{th} = d \times (n_z - n_y) \quad \text{[Equation 3]}$$

In Equation 3, "d" denotes the thickness of the film, "$n_z$" denotes the refractive index in the z-axis direction, and "$n_y$" denotes the y-axis refractive index.

The phase delay layer 141 may form the retarder using a polyimide-based polymer material. For example, when the polymer material is coated on the first base substrate 111 and is heat-treated, the phase delay layer 141 is formed using a self-alignment property of the polymer along a direction substantially parallel to the substrate. In this case, since the refractive index in the surface direction is larger than the refractive index of the z-axis direction, the negative C-plate may be realized.

Since the phase delay layer 141 includes a photo-reactive liquid crystal polymer, the phase delay layer 141 represents the anisotropic property through a self-orientation phenomenon due to an axis-selective photochemistry, which is caused by exposing the photo-reactive liquid crystal polymer to the linearly-polarized light and through a liquid crystalline property obtained by a heat-treatment. The phase delay layer 141 includes a main chain formed of polymethacrylate and a side chain substantially containing a photo reactive group and a mesogenic group or containing the photo reactive group and the mesogenic group in the form of a co-polymer.

In this case, a photoisomerization or photodimerization phenomenon may be used as a trigger for the anisotropic property.

The phase delay layer 141 may include a reactive liquid crystal layer. The reactive liquid crystal layer includes an alignment layer and a reactive liquid crystal coated on the alignment layer. The reactive liquid crystal is an organic material including photopolymerization reactive groups at both ends of the liquid crystal molecule, and the photopolymerization reactive groups are connected to each other when irradiated with ultraviolet light. Since the reactive liquid crystal has the self-alignment property, the reactive liquid crystal is aligned in substantially the same direction as the direction in which the alignment layer is aligned, and the optical axis of the reactive liquid crystal is formed along the alignment direction of the alignment layer.

Since the optical axis of the reactive liquid crystal is formed along the alignment direction of the alignment layer, the alignment direction of the alignment layer is twisted at about λ/4 (±45°) (where, λ is a wavelength of light incident onto the patterned retarder 140) with respect to the polarizing axis of the first polarizing plate 310. Then, the ultraviolet light is radiated onto the coated reactive liquid crystal, forming the phase delay layer 141.

Various organic/inorganic materials, e.g., a polymer birefringence body using a shear force, organic/inorganic birefringence body, etc., may be used to form the phase delay layer 141.

Referring to FIG. 5B, the signal lines GL and DL are formed on the lower surface of the first substrate 111. Among the signal lines GL and DL, the gate line GL is directly formed on the lower surface of the first base substrate 111, but the data line DL is formed on the gate insulating layer 112 that covers the first base substrate 111.

When the signal lines GL and DL are formed, the phase delay layer 141 is patterned using the signal lines GL and DL as a mask as shown in FIG. 5C.

For example, the phase delay layer 141 remains in the retard area RA and is removed from the transmission area TA. Thus, the patterned retarder 140 that includes the retard area RA corresponding to the signal lines GL and DL and the transmission area TA corresponding to the effective area of each pixel is formed on the upper surface of the first base substrate 111.

Figure 6A:
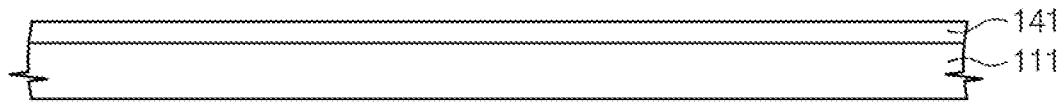
FIGS. 6A to 6C are cross-sectional views showing a process of forming a patterned retarder shown in FIG. 4, according to an exemplary embodiment of the present disclosure.
Figure 6B:
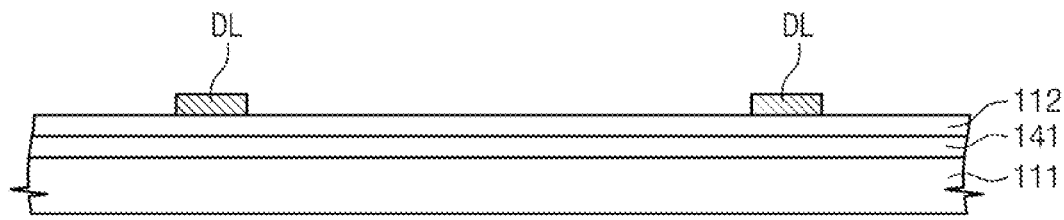
Figure 6C:
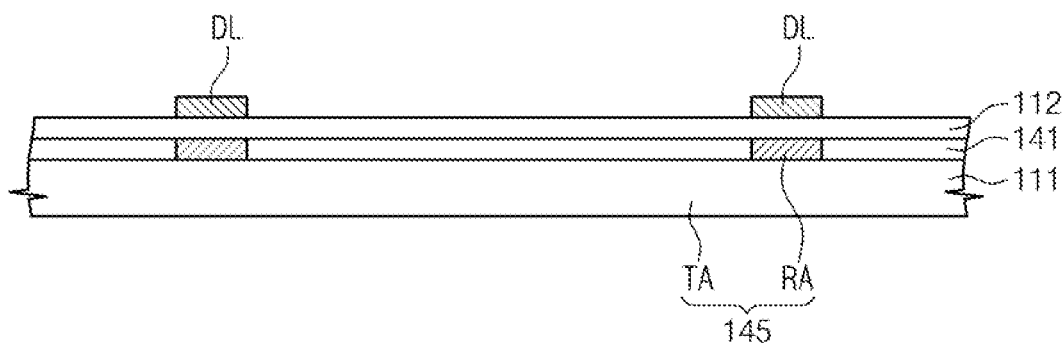

FIGS. 6A to 6C are cross-sectional views showing a process of forming a patterned retarder shown in FIG. 4, according to an exemplary embodiment of the present disclosure.

Referring to FIG. 6A, the phase delay layer 141 is coated on the first base substrate 111.

Referring to FIG. 6B, the signal lines GL and DL are formed on the phase delay layer 141. Among the signal lines GL and DL, the gate line GL is directly formed on the phase delay layer 141, but the data line DL is formed on the gate insulating layer 112 that covers the phase delay layer 141.

When the signal lines GL and DL are formed, the phase delay layer 141 is patterned using the signal lines GL and DL as a mask as shown in FIG. 6C.

For example, the phase delay layer 141 remains in the retard area RA and is removed from the transmission area TA. Therefore, the patterned retarder 140 that includes the retard area RA corresponding to the signal lines GL and DL and the transmission area TA corresponding to the effective area of each pixel is formed on one surface of the first base substrate 111.

Figure 7:
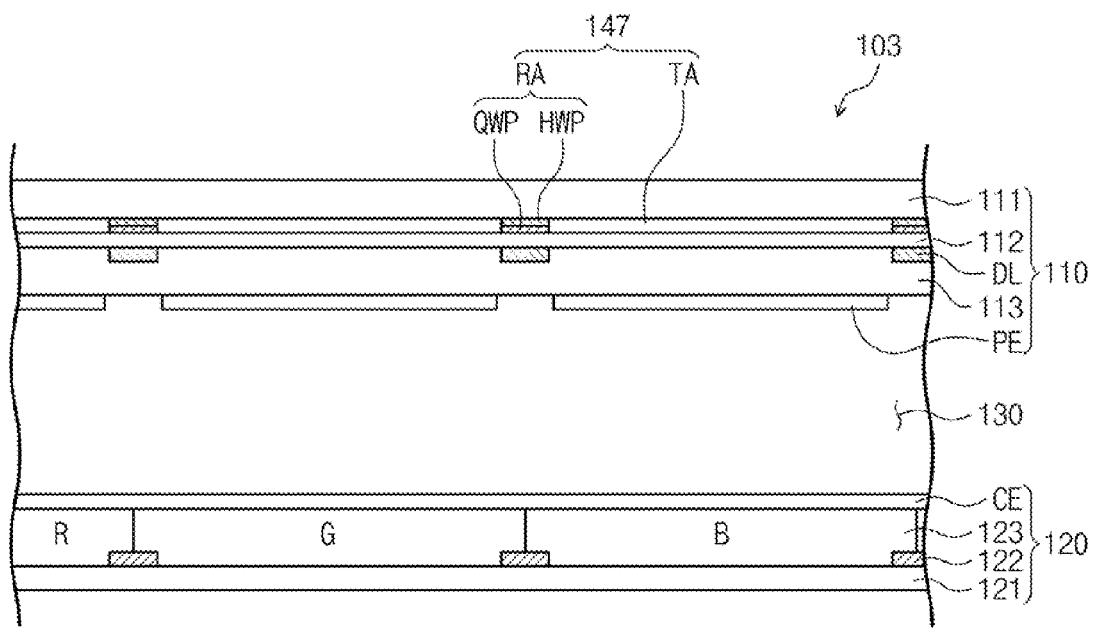
FIG. 7 is a cross-sectional view showing a liquid crystal display panel according to an exemplary embodiment of the present disclosure.

FIG. 7 is a cross-sectional view showing a liquid crystal display panel according to an exemplary embodiment of the present disclosure.

Referring to FIG. 7, in a liquid crystal display panel 103, the patterned retarder 147 is disposed on the lower surface of the first base substrate 111 and includes the retard area RA corresponding to the signal lines GL and DL and the transmission area TA corresponding to the effective area of the pixel. In the retard area RA, the patterned retarder 147 includes a first phase difference layer QWP having a phase difference of about $\lambda/4$ ($\lambda$ is a wavelength of light incident onto the patterned retarder 147) with respect to the polarizing axis of the first polarizing plate 310 and a second phase difference layer HWP having a phase difference of about $\lambda/2$ with respect to the polarizing axis of the first polarizing plate 310.

The combination of the first phase difference layer QWP and the second phase difference layer HWP provides a phase delay of about 90° with respect to two frequencies. Thus, the retard area RA of the patterned retarder 147 may have a function of a broadband $\lambda/4$ phase difference plate.

Figure 8:
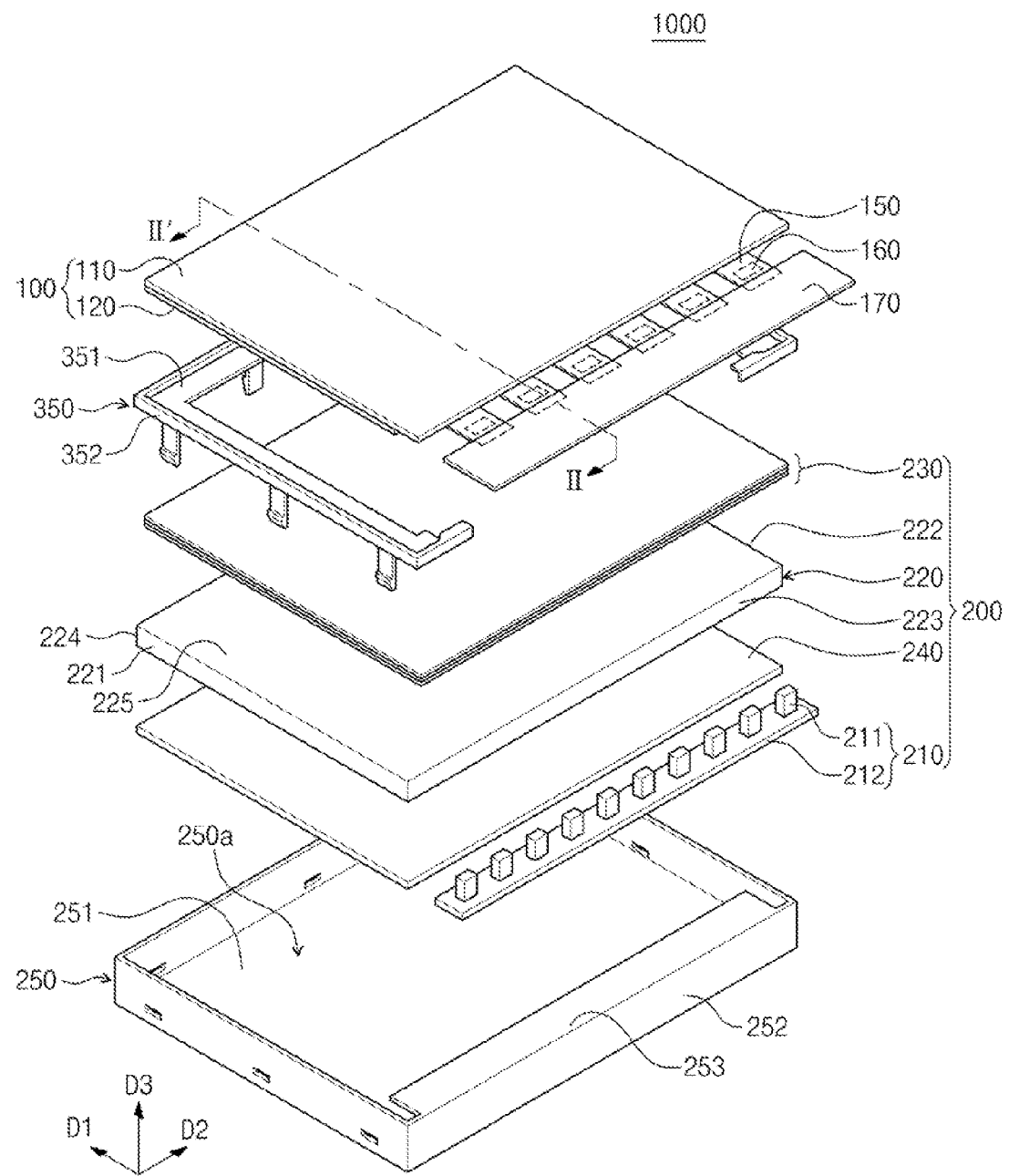
FIG. 8 is an exploded perspective view showing a display apparatus according to an exemplary embodiment of the present disclosure.

FIG. 8 is an exploded perspective view showing a display apparatus according to an exemplary embodiment of the present disclosure, and FIG. 9 is a cross-sectional view taken along line II-II' shown in FIG. 8, according to an exemplary embodiment of the present disclosure.

Referring to FIGS. 8 and 9, the display apparatus 1000 includes a display unit, a backlight unit 200, and a mold frame 350.

When viewed in a plan view, the display apparatus 1000 has a rectangular shape. A short axis direction of the display apparatus 1000 is referred to as a first direction D1 and a long axis direction of the display apparatus 1000 is referred to as a second direction D2 substantially perpendicular to the first direction D1. The backlight unit 200, the mold frame 350, and the display unit are sequentially stacked along a third direction D3 substantially perpendicular to the first and second directions D1 and D2.

The display unit includes a display panel 100 for displaying an image, a driving chip 160 for applying a driving signal to the display panel 100, and a printed circuit board 170 electrically connected to the display panel 100.

The display panel 100 includes a first substrate 110, a second substrate 120 facing the first substrate 110 and coupled to the first substrate 110, and a liquid crystal layer 130 interposed between the first substrate 110 and the second substrate 120.

When viewed in a plan view, the driving chip 160 is disposed at at least one side portion of the first substrate 110 and applies a data signal to the data line. The driving chip 160 generates the data signal in response to an external signal and applies the data signal to the data line. The external signal is provided from the printed circuit board 170. The external signal includes an image signal, various control signals, a driving voltage, etc.

The first substrate 110 includes a gate driving circuit disposed at a different side portion from the side portion where the driving chip 160 is positioned. The gate driving circuit applies a gate signal to the gate line. The gate driving circuit is formed by a thin film process for forming the display panel 100. Thus, the gate driving circuit may be built in the display panel 100.

As another example, the driving chip 160 may include a data driving chip and a gate driving chip, and the driving chip 160 may be mounted on the first substrate 110 by a chip-on-glass process.

The printed circuit board 170 is electrically connected to the display panel 100 by a plurality of tape carrier packages (TCPs) 150. The driving chip 160 is mounted on each of the TCPs 150. The TCPs 150 are bent to wrap the side surface of the backlight unit 200. The printed circuit board 170 connected to the TCPs 150 is disposed under the backlight unit 200.

The backlight unit 200 includes a light source part 210 for emitting light, a light guide plate 220 for guiding light from the light source part 210 to the display panel 100, and a back cover 250 for accommodating the light source part 210 and the light guide plate 220.

In an exemplary embodiment of the present disclosure, the backlight unit 200 may be an edge-illumination-type backlight unit. For example, the light source part 210 is disposed under the display panel 100 and provides light to at least one side surface of the light guide plate 220. The light guide plate 220 guides light incident thereto to the display panel 100 through the side surface thereof.

The light guide plate 220 includes a first side surface 221 extended in the first direction D1 of the display apparatus 1000, a second side surface 222 substantially in parallel to the first side surface 221, a third side surface 223 extended in the second direction D2 of the display apparatus 1000, and a fourth side surface 224 substantially parallel to the third side surface 223. In an exemplary embodiment of the present disclosure, the light source part 210 is disposed adjacent to the third side surface 223 of the light guide plate 220. Therefore, the third side surface 223 may be referred to as an incident surface of the light guide plate 220.

The light source part 210 includes a plurality of light sources 211 sequentially arranged along the incident surface 223, and each of the light sources 211 may be, but is not limited to, a light emitting diode. The light source part 210 further includes a support film 212 on which the light sources 211 are mounted. The light sources 211 are arranged on the support film 212 along the second direction D2 while spaced apart from each other.

The backlight unit 200 further includes optical sheets 230 disposed between the light guide plate 220 and the display panel 100 and a reflection plate 240 disposed under the light guide plate 220.

The optical sheets 230 include a diffusion sheet that diffuses light and at least one condensing sheet that condenses light for increasing the visibility and brightness of the light exiting from an exit surface of the light guide plate 220. The optical sheets 230 may further include a protective sheet disposed at an uppermost position in the optical sheets 230. The reflection plate 240 is disposed under the light guide plate 220 and reflects light leaking from the light guide plate 220 back to the light guide plate 220.

The back cover 250 includes a bottom portion 251 on which the light source part 210 and the light guide plate 220 are placed, a sidewall 252 extended from the bottom portion 251 to the third direction D3, and a cover portion 253 extended from the sidewall 252 and covering the light source part 210 and providing a space into which the incident surface 223 of the light guide plate 220 is inserted.

As an example, the back cover 250 is formed of a metal with a light reflectivity.

The mold frame 350 is disposed between the display panel 100 and backlight unit 200, and the mold frame 350 supports the display panel 100. The mold frame 350 includes a support portion 351 that supports the display panel 100 and a sidewall 352 extended from the support portion 351 in the third direction D3.

The support portion 351 and the sidewall 352 of the mold frame 350, which are disposed adjacent to the light source part 210, are partially removed, exposing the cover portion 253 of the back cover 250. Thus, the display panel 100 is placed on the cover portion 253 in an area (hereinafter, referred to as a light incident area) adjacent to the light source part 210.

A double-sided tape may be interposed between the display panel 100 and the cover portion 253. Accordingly, the display panel 100 is fixed to the cover portion 253 by the double-sided tape.

A fixing tape may be further attached onto an edge of the display panel 100 to fix the display panel 100 to the mold frame 350.

The display apparatus 1000 may further include a top cover that covers the edge of the display panel 100 and that is coupled to the back cover 250 without the fixing tape.

Referring to FIGS. 8 and 9, in the liquid crystal display panel 100, the second substrate 120 is disposed in a position to which internal light emitted from the backlight unit 200 is incident, and the first substrate 110 is disposed in a position to which the external light is incident. In this case, the TCPs 150 are attached to the side portion of the first substrate 110. The TCPs 150 are bent, and thus the printed circuit board 170 is disposed on the rear surface of the backlight unit 200.

When the first substrate 110, to which the TCPs 150 are attached, is disposed at an upper position higher than the second substrate 120, the bezel width of the display apparatus 1000 may be reduced.

When the first substrate 110 is disposed at the uppermost position in the display apparatus 1000, the patterned retarder 145 prevents the external light reflected by the signal lines GL and DL from exiting, thus increasing the contrast ratio of the display apparatus 1000.

Although exemplary embodiments of the present disclosure have been described, it is understood that various changes and modifications can be made thereto by one of ordinary skill in the art without departing from the scope of the present disclosure defined by the appended claims.

What is claimed is:

1. A display apparatus, comprising:
    a display panel comprising:
        a first substrate including a signal line and a pixel;
        a second substrate facing the first substrate; and
        a liquid crystal layer disposed between the first and second substrates, the first substrate being disposed in a position to which external light is incident;
    a polarizing plate disposed above the first substrate of the display panel; and
    a patterned retarder disposed between the polarizing plate and the signal line, wherein the patterned retarder is configured to retard the external light such that the external light reflected by the signal line does not pass through the polarizing plate,
    wherein the patterned retarder comprises a retardation area that overlaps the signal line and a transmission area that overlaps the pixel,
    wherein the transmission area does not retard light.

2. The display apparatus of claim 1, wherein the patterned retarder has a phase difference of about $\lambda/4$ with respect to a polarizing axis of the polarizing plate in the retardation area, wherein $\lambda$ is a wavelength of light incident onto the patterned retarder.

3. The display apparatus of claim 2, wherein a phase difference value of the retardation area is in a range from about 50 nm to about 350 nm.

4. The display apparatus of claim 2, wherein an optical axis of the retardation area is inclined at an angle from about 30° to about 60° with respect to the polarizing axis.

5. The display apparatus of claim 1, wherein the patterned retarder comprises a first phase difference layer having a phase difference of about $\lambda/4$ and a second phase difference layer having a phase difference of about $\lambda/2$ in the retardation area, wherein $\lambda$ is a wavelength of light incident onto the patterned retarder.

6. The display apparatus of claim 1, wherein the first substrate further comprises a first base substrate, wherein the signal line and the pixel are disposed on a first surface of the first base substrate, and the polarizing plate is disposed on a second surface of the first base substrate, and wherein the second surface is opposite the first surface.

7. The display apparatus of claim 6, wherein the patterned retarder is disposed between the first surface of the first base substrate and the signal line.

8. The display apparatus of claim 6, wherein the patterned retarder is disposed between the second surface of the first base substrate and the polarizing plate.

9. The display apparatus of claim 1, further comprising a backlight unit disposed under the second substrate and facing the second substrate, wherein the backlight unit is configured to provide light to the display panel.

10. The display apparatus of claim 9, further comprising:
    a flexible film attached to a side portion of the first substrate; and
    a printed circuit board electrically connected to the flexible film, wherein the flexible film is bent to allow the printed circuit board to be disposed on a rear surface of the backlight unit.

11. A display apparatus, comprising:
    a display panel comprising:
    a first substrate including a signal line and a pixel; and
    a second substrate facing the first substrate; and
    a first polarizer disposed above the first substrate of the display panel, the first polarizer configured to linearly polarize external light; and
    a patterned retarder disposed between the first polarizer and the signal line, the patterned retarder configured to circularly polarize the linearly polarized external light,
    wherein the patterned retarder comprises a retardation area that overlaps the signal line and a transmission area that corresponds to an effective area of the pixel,
    wherein the transmission area is disposed between adjacent retardation areas, and the transmission area does not retard light.

12. A method of manufacturing a display apparatus, the method comprising:
    forming a display panel, the display panel including:
        a first substrate including a signal line and a pixel;
        a second substrate facing the first substrate; and
        a liquid crystal layer disposed between the first and second substrates, the first substrate being disposed in a position to which external light is incident;
    forming a patterned retarder on the display panel; and
    attaching a polarizing plate onto the first substrate of the display panel in which the patterned retarder is formed,
    wherein the patterned retarder is disposed between the polarizing plate and the signal line, and the patterned retarder is configured to retard the external light such that the external light reflected by the signal line does not pass through the polarizing plate, wherein the patterned retarder comprises a retardation area corresponding to the signal line and a transmission area corresponding to an effective area of the pixel, wherein forming the display panel comprises:
forming a phase delay layer on a first surface of a first base substrate of the first substrate;
forming the signal line on a second surface of the first base substrate; and
patterning the phase delay layer using the signal line as a mask to form the patterned retarder.

13. The method of claim 12, wherein the patterned retarder has a phase difference of about $\lambda/4$ with respect to a polarizing axis of the polarizing plate in the retardation area, wherein $\lambda$ is a wavelength of light incident onto the patterned retarder.

14. The method of claim 13, wherein a phase difference value of the retardation area is in a range from about 50 nm to about 350 nm.

15. The method of claim 13, wherein an optical axis of the retardation area is inclined at an angle from about 30° to about 60° with respect to the polarizing axis.

16. The method of claim 12, wherein the patterned retarder comprises a first phase difference layer having a phase difference of about $\lambda/4$ and a second phase difference layer having a phase difference of about $\lambda/2$ in the retardation area, wherein $\lambda$ is a wavelength of light incident onto the patterned retarder.

17. A method of manufacturing a display apparatus, the method comprising:
forming a display panel, the display panel including:
a first substrate including a signal line and a pixel;
a second substrate facing the first substrate; and
a liquid crystal layer disposed between the first and second substrates, the first substrate being disposed in a position to which external light is incident;
forming a patterned retarder on the display panel; and
attaching a polarizing plate onto the first substrate of the display panel in which the patterned retarder is formed,
wherein the patterned retarder is disposed between the polarizing plate and the signal line, and the patterned retarder is configured to retard the external light such that the external light reflected by the signal line does not pass through the polarizing plate,
wherein the patterned retarder comprises a retardation area corresponding to the signal line and a transmission area corresponding to an effective area of the pixel,
wherein forming the display panel comprises:
forming a phase delay layer on a surface of a first base substrate of the first substrate;
forming the signal line on the phase delay layer; and
patterning the phase delay layer using the signal line as a mask to form the patterned retarder.

* * * * *